US012716574B2

(12) United States Patent
Hu

(10) Patent No.: US 12,716,574 B2
(45) Date of Patent: Aug. 25, 2026

(54) LAMP WITH LAMPSHADE AND END COVERS REPLACEABLE

(71) Applicant: SHAOXING HOMATE LIGHTING CO., LTD, Shaoxing (CN)

(72) Inventor: Junle Hu, Shaoxing (CN)

(73) Assignee: SHAOXING HOMATE LIGHTING CO., LTD, Shaoxing (CN)

( * ) Notice: Subject to any disclaimer, the term of this patent is extended or adjusted under 35 U.S.C. 154(b) by 0 days.

(21) Appl. No.: 19/344,833

(22) Filed: Sep. 30, 2025

(65) Prior Publication Data

US 2026/0104156 A1 Apr. 16, 2026

(30) Foreign Application Priority Data

Oct. 11, 2024 (CN) ........................ 202422460445.X

(51) Int. Cl.

| | |
|---|---|
| ***F21V 17/06*** | (2006.01) |
| ***F21S 4/20*** | (2016.01) |
| ***F21V 3/00*** | (2015.01) |
| ***F21V 15/015*** | (2006.01) |
| ***F21V 17/00*** | (2006.01) |

(52) U.S. Cl.

CPC ................ *F21V 17/06* (2013.01); *F21S 4/20* (2016.01); *F21V 15/015* (2013.01); *F21V 17/002* (2013.01); *F21V 3/00* (2013.01)

(58) Field of Classification Search

CPC .. F21S 4/20–28; F21V 3/00; F21V 15/00–04; F21V 17/00–20

See application file for complete search history.

(56) References Cited

U.S. PATENT DOCUMENTS 9,909,721 B1 * 3/2018 Deng .................... F21V 15/015

FOREIGN PATENT DOCUMENTS

CN 106678665 A * 5/2017 ............ F21V 21/108

* cited by examiner

*Primary Examiner* — Jason M Han
(74) *Attorney, Agent, or Firm* — HOWARD M COHN and Associates, LLC

(57) ABSTRACT

Provided is a lamp with a lampshade and end covers replaceable, including a lamp body and a lamp strip. Two lower end covers are symmetrically installed at both ends of the lamp body, and two upper end covers are symmetrically installed at both ends of the lamp strip. A lampshade is installed on the lamp strip. The upper end cover includes an inner end cover and an outer end cover. The inner end cover is fixed to the lamp strip, and the outer end cover is detachably connected to the lamp strip. A first insertion foot and a second insertion foot are provided beneath the inner end cover, while a first insertion pin and a second insertion pin are provided on the inner side of the lower end cover at positions corresponding to the first insertion foot and the second insertion foot.

10 Claims, 7 Drawing Sheets

LAMP WITH LAMPSHADE AND END COVERS REPLACEABLE

TECHNICAL FIELD

The present disclosure relates to lighting equipment, and more particularly, to a lamp with a lampshade and end covers replaceable.

BACKGROUND

In modern lighting design, lamps serve not only as tools for providing light sources, but also as vital components of interior decoration. As aesthetic demands for residential and commercial spaces continue to evolve, lamp design and functionality are likewise developing and innovating. Existing lamps are configured with a lampshade before delivery. Users cannot typically adapt different styles of lampshades to style or season changes, failing to meet customized demands for personalized lamps.

SUMMARY

Aiming to resolve the foregoing technical problems, the present disclosure provides a lamp with a lampshade and end covers replaceable, offering users more personalized choices and flexibility.

To resolve the foregoing technical problems, the present disclosure provides a lamp with a lampshade and end covers replaceable, including a lamp body and a lamp strip. Two lower end covers are symmetrically installed at both ends of the lamp body, and two upper end covers are symmetrically installed at both ends of the lamp strip. A lampshade is installed on the lamp strip.

The upper end cover includes an inner end cover and an outer end cover. The inner end cover is fixed to the lamp strip, and the outer end cover is detachably connected to the lamp strip. When the outer end cover is removed, the lampshade is detachable relative to the lamp strip.

A first insertion foot and a second insertion foot are provided beneath the inner end cover, while a first insertion pin and a second insertion pin are provided on the inner side of the lower end cover at positions corresponding to the first insertion foot and the second insertion foot. The first insertion foot is detachable outward from the first insertion pin, and the second insertion foot is rotatable relative to the second insertion pin.

An edge of the lamp body and an edge of the lamp strip are detachably connected by a snap-fit structure.

In a preferred embodiment, first hook portions are symmetrically provided along both side edges of the lamp body, and second hook portions are symmetrically provided downward along both side edges of the lamp strip. The first hook portions and second hook portions form the snap-fit structure.

The first hook portion includes an elastic edge and a hook slot. The elastic edge is capable of elastic deformation to allow motion of the second hook portion, and the second hook portion is engaged within the hook slot.

In a preferred embodiment, a boss is provided inward from a lower edge of the outer end cover, and the boss is fastened to the lamp strip by a screw.

A protrusion is provided on the inner side of the outer end cover, the boss and an edge of the outer end cover form an insertion seam, and the insertion seam is inserted onto an end of the lampshade.

In a preferred embodiment, flanges are symmetrically provided inward on both sides of a lampshade opening of the lampshade, and a plurality of clamping points are spaced apart in a length direction of the edge of the lamp strip. Clamping points are provided on both sides of the lamp strip. The flanges are inserted through the clamping points.

In a preferred embodiment, the first insertion foot is provided with a first elongated slot, and the second insertion foot is provided with a second elongated slot.

An opening is provided at the bottom of the first elongated slot to allow the first insertion pin to enter and exit, and the second elongated slot provides room for the second insertion pin to move up and down.

In a preferred embodiment, the first elongated slot includes a first edge and a second edge. A guiding beveled edge extends downward from the opening on the second edge, and the guiding beveled edge is configured for guiding the first insertion pin in or out.

In a preferred embodiment, the second elongated slot includes a straight slot portion and an inclined slot portion which are interconnected.

The second insertion pin moves within the straight slot portion, enabling the lamp strip to perform a vertical insertion motion relative to the lamp body.

The second insertion pin moves within the inclined slot portion, disengaging the first insertion foot from the first insertion pin, and allowing the lamp strip to rotate relative to the lamp body.

In a preferred embodiment, notches are provided on both sides of the lower end cover to allow motion of the first insertion foot and the second insertion foot.

In a preferred embodiment, a rotation angle of the second insertion foot relative to the second insertion pin is greater than 115°.

In a preferred embodiment, the lamp strip is configured with a plurality of outer end covers and a plurality of lampshades. The outer end covers are paired with the lampshades.

Compared with the existing technology, the technical solutions of the present disclosure have the following beneficial effects.

1. By providing the detachable outer end cover and lampshade, lampshades and outer end covers with different structures may be replaced on a same lamp, and the lamp is transformed into lamps of different styles and shapes, to meet customers' layout requirements for different styles and scenarios.

2. By providing the outer end cover to fix the side of the lampshade and enabling structural pairing between the outer end cover and the lampshade, a more attractive lamp can be implemented when lampshades of different styles are replaced.

3. Through the snap-fit connection between the lamp body and the lamp strip, the lamp strip is fixed. The relative rotation between the lamp body and the lamp strip makes operations such as disassembly, assembly, installation, and wiring simpler, thereby facilitating installation and removal of the lampshade.

4. The lamp body and the lamp strip are rotatably connected by the second insertion foot and the second insertion pin, to form a hinge-type connection structure, enabling more convenient rotation and opening of the lamp strip relative to the lamp body, providing a larger opening angle, and offering greater convenience for wiring layout and installation of the lampshade and the outer end cover.

Figure 1:
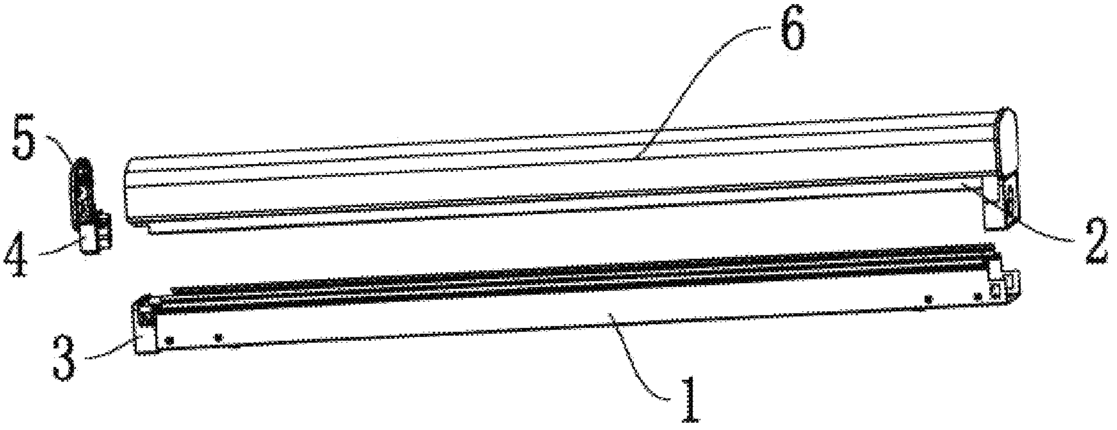
FIG. 1 is an exploded view of a lamp in a preferred embodiment of the present disclosure.

Reference numerals: 1, lamp body; 11, first hook portion; 12, elastic edge; 13, hook slot; 2, lamp strip; 21, second hook portion; 22, clamping point; 3, lower end cover; 31, first insertion pin; 32, second insertion pin; 33; notch; 4, inner end cover; 41, first insertion foot; 411, first elongated slot; 412, first edge; 413, second edge; 414, guiding beveled edge; 42, second insertion foot; 421, second elongated slot; 422, straight slot portion; 423, inclined slot portion; 5, outer end cover; 51, boss; 52, screw; 53, protrusion; 54, insertion seam; 6, lampshade; and 61, flange.

DETAILED DESCRIPTION

The technical solutions in embodiments of the present disclosure will be clearly and completely described below in conjunction with the accompanying drawings in the embodiments of the present disclosure. It is apparent that the described embodiments are merely a part of the embodiments of the present disclosure, and not all of the embodiments. All other embodiments obtained by a person of ordinary skill in the art based on the embodiments of the present disclosure without making creative efforts shall fall within the scope of protection of the present disclosure.

In the description of the present disclosure, it should be noted that the orientation or positional relationship indicated by the terms such as "upper," "lower," "inner," "outer," and "top/bottom" is based on the orientation or positional relationship shown in the accompanying drawings. This is only for the convenience of describing the present disclosure and simplifying the description, and does not indicate or imply that the referred device or element must have a specific orientation, be constructed and operated in a specific orientation, and therefore should not be understood as a limitation to the present disclosure. Furthermore, the terms "first" and "second" are used for descriptive purposes only and cannot be understood as indicating or implying relative importance.

In the description of the present disclosure, it should be noted that, unless otherwise explicitly specified and defined, the terms "installation," "provided with," "sleeved with/sleeved over," and "connection" should be understood broadly. For example, "connection" may be a wall-mounted connection, a detachable connection, or an integral connection. The connection be a mechanical connection or an electrical connection. The connection may be a direct connection or an indirect connection through an intermediate medium. The connection may be an internal communication between two elements. A person of ordinary skill in the art can understand the specific meanings of the foregoing terms in the present disclosure based on the specific circumstances.

Referring to FIG. 1 to FIG. 12, this embodiment provides a lamp with a lampshade 6 and end covers replaceable. The lamp includes a lamp body 1 and a lamp strip 2. Two lower end covers 3 are symmetrically installed at both ends of the lamp body 1, two upper end covers are symmetrically installed at both ends of the lamp strip 2, and the lampshade 6 is installed on the lamp strip 2. The lamp strip 2 and the lamp body 1 are detachably connected by a snap-fit structure. When the lamp strip 2 is pulled out relative to the lamp body 1, the cooperation between the upper end covers and the lower end covers 3 enables the lamp strip 2 to rotate relative to the lamp body 1.

The lower end cover 3 includes an inner end cover 4 and an outer end cover 5. The inner end cover 4 is fixed to both ends of the lamp strip 2, while the outer end cover 5 is detachably installed to the lamp strip 2. When the outer end cover 5 is removed from the lamp strip 2, the lampshade 6 may be removed and replaced relative to the lamp strip 2.

Figure 2:
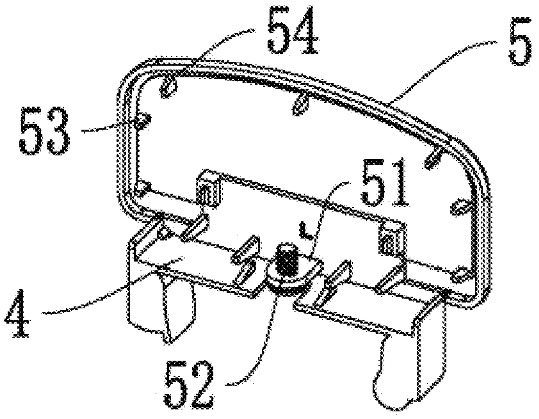
FIG. 2 is a structural diagram of an upper end cover in a preferred embodiment of the present disclosure.

As shown in FIG. 2, specifically, a boss 51 protrudes inward from a lower edge of the outer end cover 5. The boss 51 is fastened to the lamp strip 2 by a screw 52. The outer end cover 5 may be removed by removing the screw 52. In addition, a plurality of protrusions 53 are provided on the inner side of the outer end cover 5. The protrusions 53 are spaced apart along an edge of the outer end cover 5. The protrusions 53 and the edge of the outer end cover 5 form an insertion seam 54. The insertion seam 54 enables insertion onto rims at both ends of the lampshade 6. The outer end cover 5 is fixed by the insertion assembly of the screw 52 and the insertion seam 54, and outward movement of both ends of the lampshade 6 is restricted by fixing the outer end cover 5.

Figure 5:
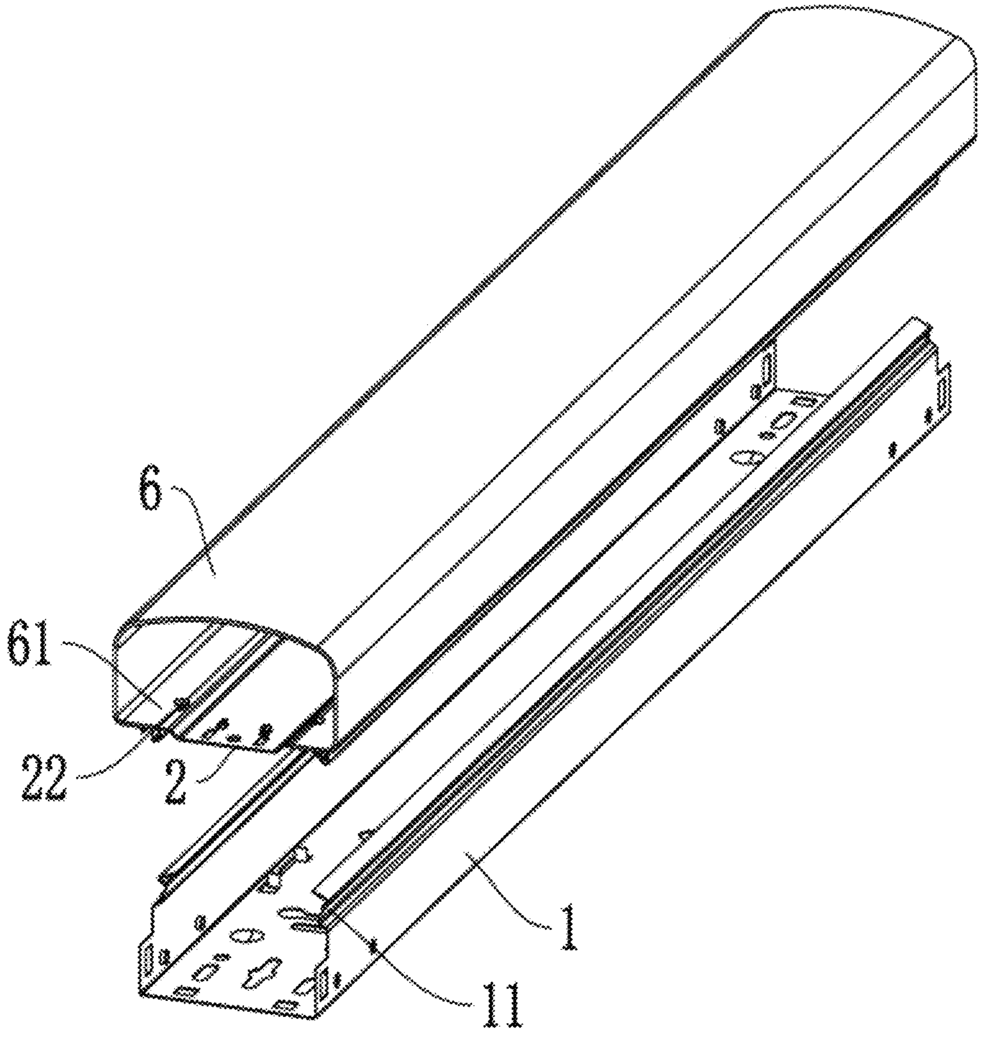
FIG. 5 is a diagram showing a snap-fit structure between a lamp body and a lamp strip in a preferred embodiment of the present disclosure.

As shown in FIG. 5, regarding the installation between the lampshade 6 and the lamp strip 2, flanges 61 are symmetrically provided inward on both sides of a lampshade opening of the lampshade 6. At the position on the lamp strip 2 where the lampshade 6 is installed, a plurality of clamping points 22 are spaced apart in a length direction of the edge of the lamp strip 2. Clamping points 22 are provided on both sides of the lamp strip 2. The clamping point 22 is provided with a clamping notch for clamping with the flanges 61 to fix the lampshade 6. After the lampshade 6 is installed by threading the flanges 61 through the clamping points 22, the lampshade 6 is limited and fixed by using the insertion seam 54 on the outer end cover 5, resulting in a stable installation of the lampshade 6 onto the lamp strip 2. When replacement of the lampshade 6 is required, the outer end cover 5 is removed, and the lampshade 6 may be pulled away along the edge of the lamp strip 2, or the lampshade opening may be spread apart to disengage from the clamping points 22. The limiting function of the outer end cover 5 not only restricts lateral movement of the lampshade 6 but also utilizes the insertion seam 54 to restrict deformation of the lampshade opening.

Regarding the installation of the lamp body 1 and the lamp strip 2, first hook portions 11 are symmetrically provided along both side edges of the lamp body 1, and second hook portions 21 are symmetrically provided downward along both side edges of the lamp strip 2. The second hook portions engage with the first hook portions 11, to form a detachable connection between the lamp body 1 and the lamp strip 2.

Figure 6:
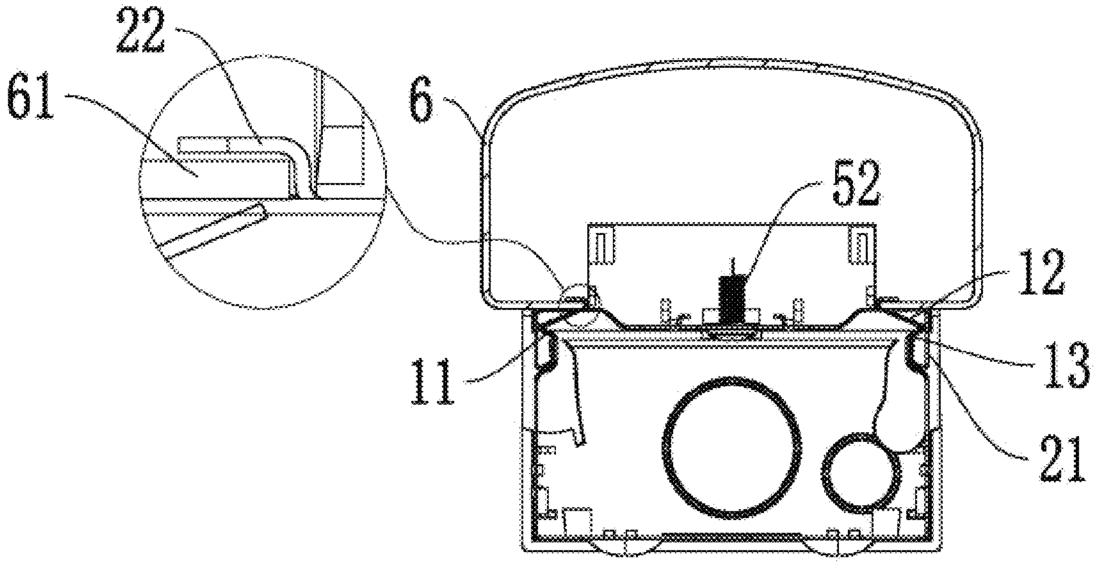
FIG. 6 is a cross-sectional view showing an initial state of a lamp in a preferred embodiment of the present disclosure.

As shown in FIG. 6, the first hook portion 11 includes an elastic edge 12 and a hook slot 13. The elastic edge 12 is capable of elastic deformation to allow motion of the second hook portion 21. The second hook portion 21 is engaged within the hook slot 13. Both the upper and lower parts of the elastic edge 12 are beveled. Under no external force, the second hook portion 21 remains engaged within the hook slot. When an external force is applied to the lamp strip 2, the lamp strip 2 is pulled up, and the second hook portion 21 presses against the first hook portion 11 on the lamp body 1, causing the first hook portion to retract inward and form clearance. The second hook portion 21 may be disengaged from the first hook portion 11 to move upward. In this case, the lamp strip 2 is disengaged from the lamp body 1. Conversely, when an external force is applied to the lamp strip 2, the lamp strip 2 is pressed downward, the elastic edge 12 retracts inward, and the second hook portion 21 is engaged within the hook slot 13 to form a snap-fit connection, thereby fixing the lamp strip 2.

Regarding the rotatable installation of the lamp strip 2 relative to the lamp strip 2, a first insertion foot 41 and a second insertion foot 42 are provided beneath the inner end cover 4, while a first insertion pin 31 and a second insertion pin 32 are correspondingly provided on the inner side of the lower end cover 3 at positions corresponding to the first insertion foot 41 and the second insertion foot 42. The first insertion foot 41 is detachable outward from the first insertion pin 31, and the second insertion foot 42 is rotatable relative to the second insertion pin 32.

It should be noted that the structure of rotatable installation of the lamp strip 2 relative to the lamp strip 2 may be a hinge structure, and the structure of rotational connection between the second insertion foot 42 and the second insertion pin 32 may be a hinge structure.

Figure 3:
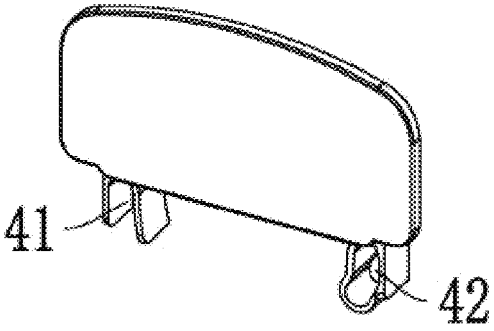
FIG. 3 is a structural diagram of a first insertion foot and a second insertion foot in a preferred embodiment of the present disclosure.

As shown in FIG. 3, the first insertion foot 41 is provided with a first elongated slot 411, and the second insertion foot 42 is provided with a second elongated slot 421. An opening is provided at the bottom of the first elongated slot 411 to allow the first insertion pin 31 to enter and exit. The second elongated slot 421 provides room for the second insertion pin 32 to move up and down.

The provision of the first elongated slot 411 and the second elongated slot 421 enables the upward pulling motion of the lamp strip 2 from the lamp body 1. After the snap-fit connection between the lamp strip 2 and the lamp body 1 is released, the cooperation between the second elongated slot 421 and the second insertion pin 32 on the lamp strip 2 allows the lamp strip 2 to rotate at an angle greater than 115°. After the lamp strip 2 is rotated, a screw 52 fastening structure is exposed, better facilitating the removal of the outer end cover 5 and the replacement of the lampshade 6. The rotational design of the lamp strip 2 allows all detachable structures to be concealed within the lamp body 1, improving the attractiveness of the lamp during normal use.

Figure 8:
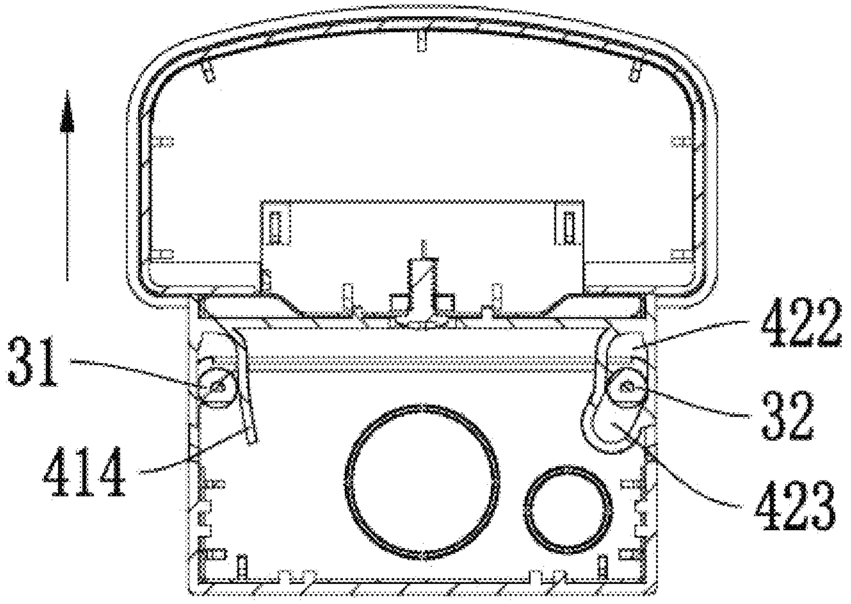
FIG. 8 is a cross-sectional view showing separation of a lamp body from a lamp strip in a preferred embodiment of the present disclosure.
Figure 9:
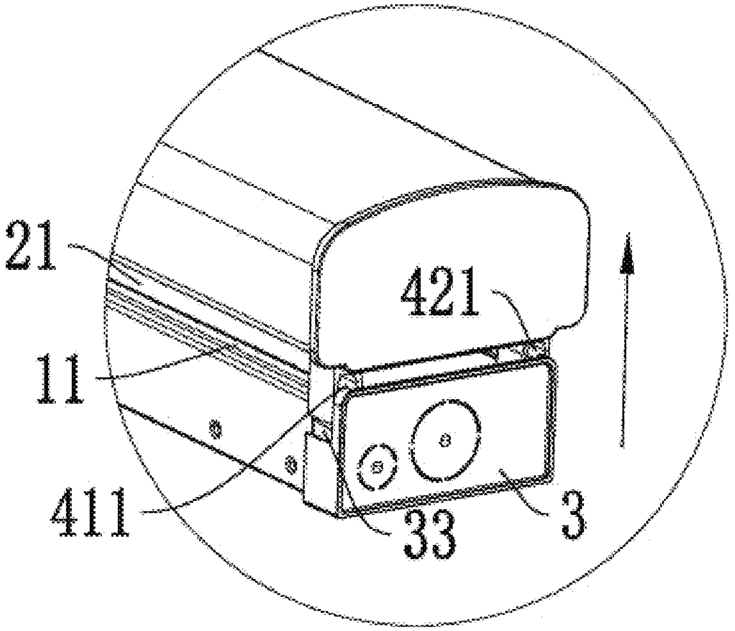
FIG. 9 is a schematic diagram showing separation of a lamp body from a lamp strip in a preferred embodiment of the present disclosure.

Specifically, the first elongated slot 411 includes a first edge 412 and a second edge 413. A guiding beveled edge 414 extends downward from the opening on the second edge 413. The guiding beveled edge 414 is configured for guiding the first insertion pin 31 in or out. As shown in FIG. 8 and FIG. 9, after the lamp strip 2 is pulled upward, the first insertion pin 31 is placed at the bottom of the first edge 412. In a case that the second elongated slot 421 and the second insertion pin 32 are rotatably connected, the lamp strip 2 falls freely, with the rotation state shown in FIG. 10.

The second elongated slot 421 includes a straight slot portion 422 and an inclined slot portion 423 which are interconnected. The straight slot portion 422 allows vertical motion of the second insertion pin 32, enabling the vertical insertion motion of the lamp strip 2 relative to the lamp body 1. After the snap-fit connection between the lamp body 1 and the lamp strip 2 is disengaged, the inclined slot portion 423 guides the rotation of the second insertion pin 32, causing the first insertion pin 31 to be disengaged from the first elongated slot 411 under the action of the guiding beveled edge 414.

Figure 4:
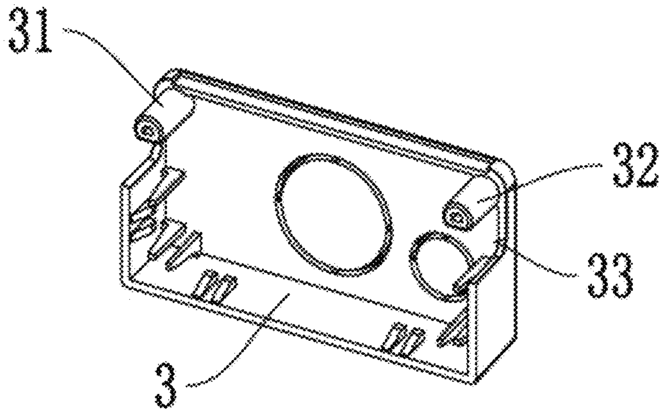
FIG. 4 is a structural diagram of a lower end cover in a preferred embodiment of the present disclosure.
Figure 12:
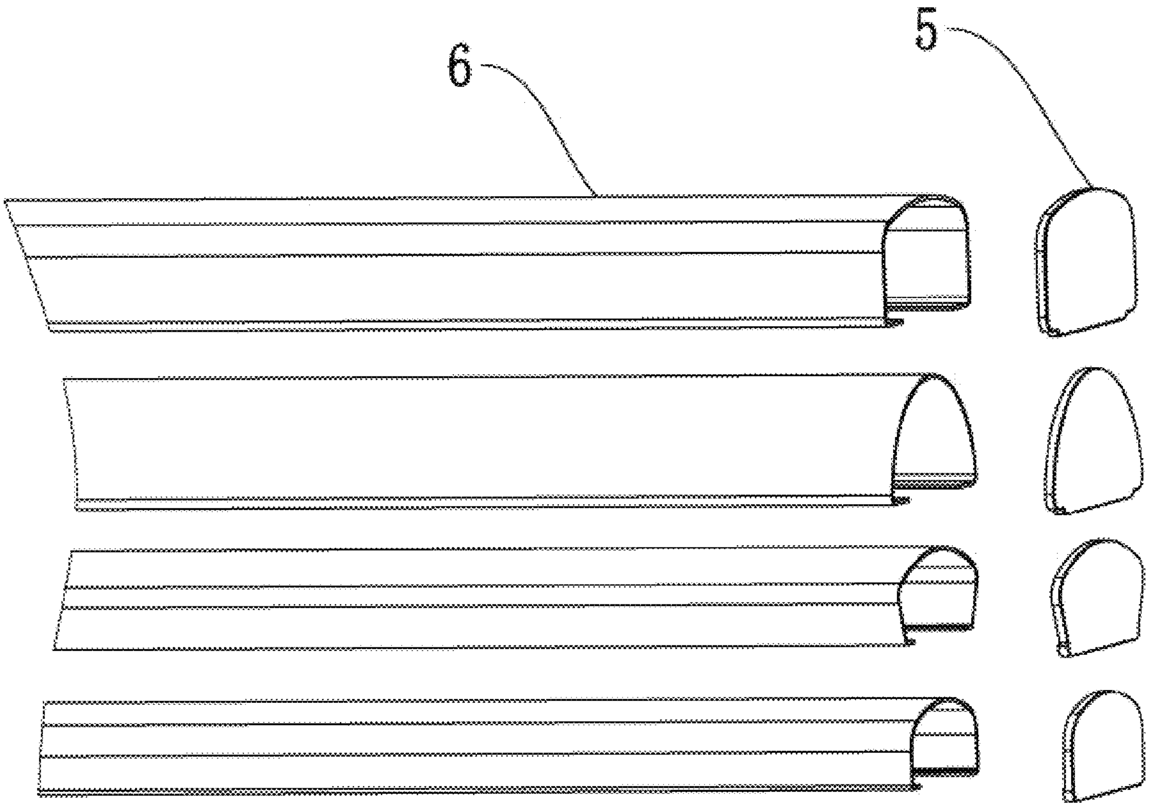
FIG. 12 is a pairing diagram of different lampshades and outer end covers in a preferred embodiment of the present disclosure.

As shown in FIG. 4, notches 33 are provided on both sides of the lower end cover 3 to allow motion of the first insertion foot 41 and the second insertion foot 42, enabling smoother rotation of the lamp strip 2 for the replacement of the lampshade 6. As shown in FIG. 12, regarding the replacement configuration of the lampshade 6, a variety of lampshades 6 with different shapes may be configured. The outer end cover 5 in shape fit with the lampshade 6 is configured according to different shapes of lampshades 6, ensuring smooth overall contour lines and attractiveness of the lamp.

Figure 7:
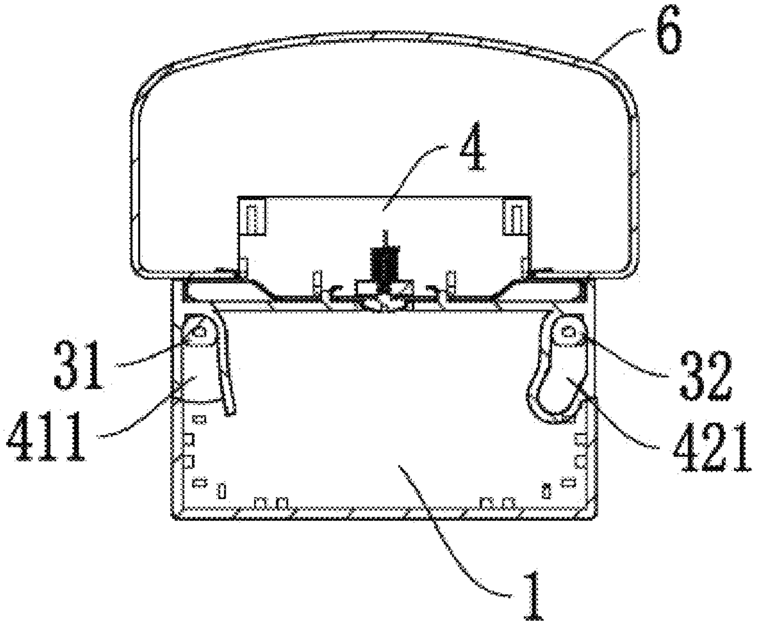
FIG. 7 is an assembly diagram of an inner end cover and a lower end cover in an initial state of a lamp in a preferred embodiment of the present disclosure.
Figure 10:
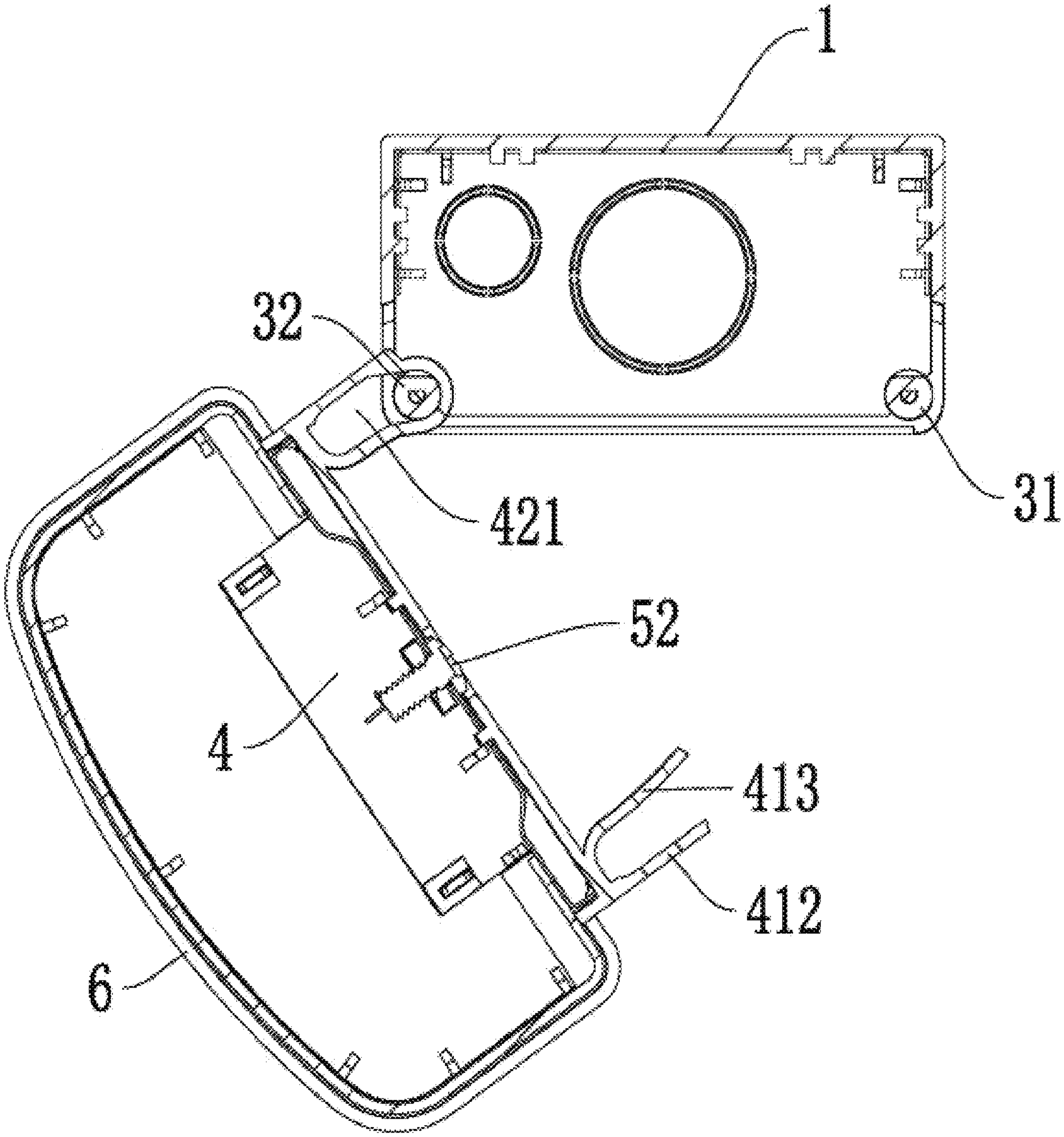
FIG. 10 is a cross-sectional view showing rotation of a lamp strip relative to a lamp strip in a preferred embodiment of the present disclosure.
Figure 11:
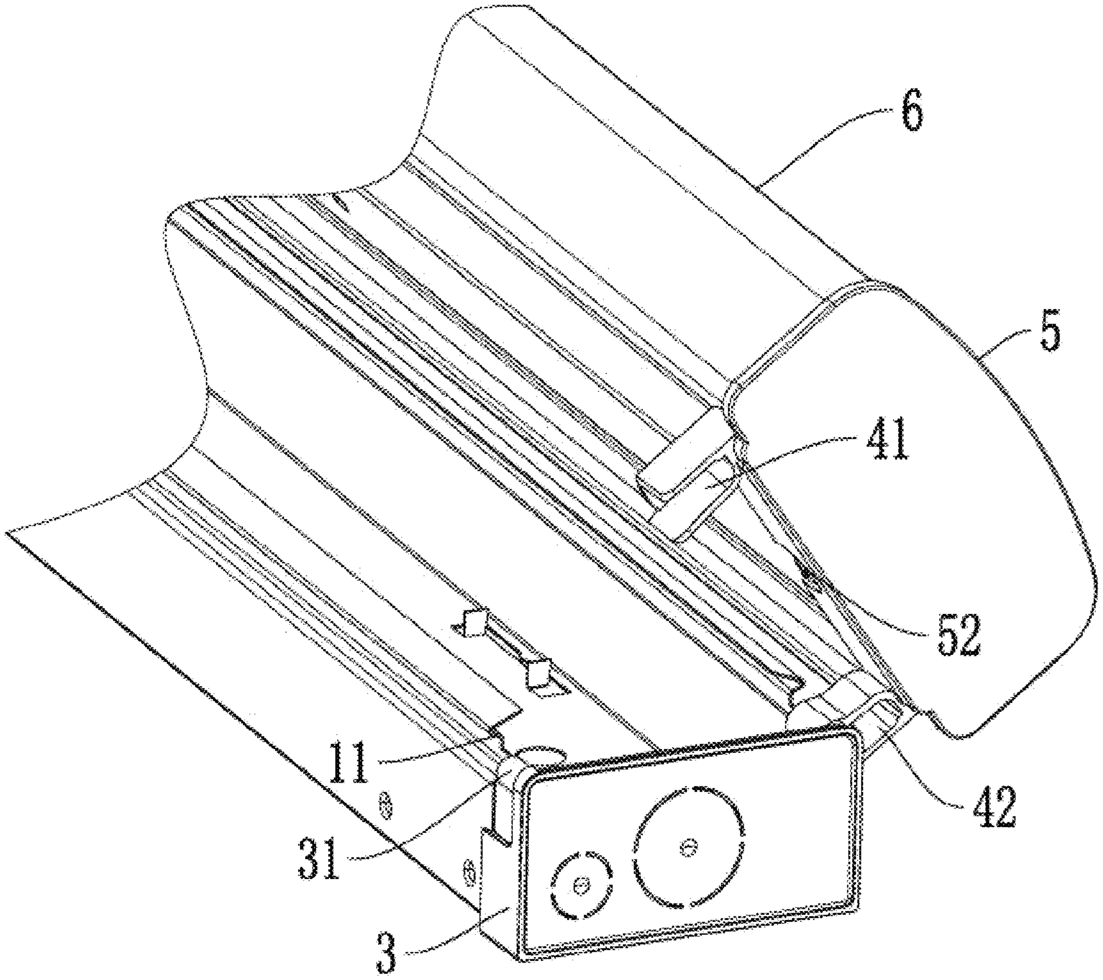
FIG. 11 is a schematic diagram showing rotation of a lamp strip relative to a lamp strip in a preferred embodiment of the present disclosure.

In the steps of replacing the lampshade 6, as shown in FIG. 6 and FIG. 7, during normal use of the lamp, the lamp strip 2 is fixed to the lamp body 1 by the second hook portion 21 engaging the first hook portion 11. When replacement of the lampshade 6 is required, as shown in FIG. 8 and FIG. 9, the lamp strip 2 is gripped and pulled outward, the second hook portion 21 presses against the elastic edge 12 and is disengaged from the first hook portion 11. In this case, the lamp strip 2 is movable. The first insertion pin 31 moves to a bottom opening of the first elongated slot 411, and the second insertion pin 32 moves to a junction of the straight slot portion 422 and the inclined slot portion 423. As shown in FIG. 10, the lamp is hung at a height. When the lamp strip 2 is movable and the first insertion pin 31 is at the opening, the second insertion pin 32 is in a rotational support shaft fit with the second elongated slot 421. Under the weight of the lamp strip 2, the second insertion pin 32 moves along the inclined slot portion 423 and is placed at the bottom of the inclined slot portion 423, while the first insertion pin 31 is disengaged from the first elongated slot 411. A structure in which the outer end cover 5 is fastened to the lamp strip 2 by the screw 52 is exposed. In this case, the lampshade 6 and the outer end cover 5 may be replaced correspondingly simply by removing the screw.

The foregoing descriptions are merely preferred specific implementations of the present disclosure and are not intended to limit the scope of the design concept of the present disclosure. Any person skilled in the art, within the technical scope disclosed by the present disclosure, may make non-substantial modifications to the present disclosure using this concept. Such actions shall be deemed as falling within the scope of protection of the present disclosure and constitute infringement.

What is claimed is:

1. A lamp with a lampshade and end covers replaceable, comprising a lamp body and a lamp strip, wherein two lower end covers are symmetrically installed at both ends of the lamp body, and two upper end covers are symmetrically installed at both ends of the lamp strip; a lampshade is installed on the lamp strip;

the upper end cover comprises an inner end cover and an outer end cover, the inner end cover is fixed to the lamp strip, and the outer end cover is detachably connected to the lamp strip; when the outer end cover is removed, the lampshade is detachable relative to the lamp strip;

a first insertion foot and a second insertion foot are provided beneath the inner end cover, while a first insertion pin and a second insertion pin are provided on the inner side of the lower end cover at positions corresponding to the first insertion foot and the second insertion foot; the first insertion foot is detachable outward from the first insertion pin, and the second insertion foot is rotatable relative to the second insertion pin; and an edge of the lamp body and an edge of the lamp strip are detachably connected by a snap-fit structure.

2. The lamp with a lampshade and end covers replaceable according to claim 1, wherein first hook portions are symmetrically provided along both side edges of the lamp body, and second hook portions are symmetrically provided downward along both side edges of the lamp strip; the first hook portions and second hook portions form the snap-fit structure; and the first hook portion comprises an elastic edge and a hook slot, the elastic edge is capable of elastic deformation to allow motion of the second hook portion, and the second hook portion is engaged within the hook slot.

3. The lamp with a lampshade and end covers replaceable according to claim 1, wherein a boss is provided inward from a lower edge of the outer end cover, and the boss is fastened to the lamp strip by a screw; and a protrusion is provided on the inner side of the outer end cover, the boss and an edge of the outer end cover form an insertion seam, and the insertion seam is inserted onto an end of the lampshade.

4. The lamp with a lampshade and end covers replaceable according to claim 3, wherein flanges are symmetrically provided inward on both sides of a lampshade opening of the lampshade, and a plurality of clamping points are spaced apart in a length direction of the edge of the lamp strip; clamping points are provided on both sides of the lamp strip; and the flanges are inserted through the clamping points.

5. The lamp with a lampshade and end covers replaceable according to claim 1, wherein the first insertion foot is provided with a first elongated slot, and the second insertion foot is provided with a second elongated slot; and an opening is provided at the bottom of the first elongated slot to allow the first insertion pin to enter and exit, and the second elongated slot provides room for the second insertion pin to move up and down.

6. The lamp with a lampshade and end covers replaceable according to claim 5, wherein the first elongated slot comprises a first edge and a second edge, a guiding beveled edge extends downward from the opening on the second edge, and the guiding beveled edge is configured for guiding the first insertion pin in or out.

7. The lamp with a lampshade and end covers replaceable according to claim 6, wherein the second elongated slot comprises a straight slot portion and an inclined slot portion which are interconnected;

the second insertion pin moves within the straight slot portion, enabling the lamp strip to perform a vertical insertion motion relative to the lamp body; and the second insertion pin moves within the inclined slot portion, disengaging the first insertion foot from the first insertion pin, and allowing the lamp strip to rotate relative to the lamp body.

8. The lamp with a lampshade and end covers replaceable according to claim 5, wherein notches are provided on both sides of the lower end cover to allow motion of the first insertion foot and the second insertion foot.

9. The lamp with a lampshade and end covers replaceable according to claim 1, wherein a rotation angle of the second insertion foot relative to the second insertion pin is greater than 115°.

10. The lamp with a lampshade and end covers replaceable according to claim 1, wherein the lamp strip is configured with a plurality of outer end covers and a plurality of lampshades, and the outer end covers are paired with the lampshades.

* * * * *